United States Patent [19]

Kawamura

[11] 4,136,756

[45] Jan. 30, 1979

[54] SUCTION AIR MUFFLER FOR A MOTORCYCLE

[75] Inventor: Yoshio Kawamura, Akashi, Japan

[73] Assignee: Kawasaki Jukogyo Kabushiki Kaisha, Hyogo, Japan

[21] Appl. No.: 862,485

[22] Filed: Dec. 20, 1977

Related U.S. Application Data

[63] Continuation of Ser. No. 672,331, Mar. 31, 1976, abandoned.

[30] Foreign Application Priority Data

Apr. 19, 1975 [JP] Japan .................................. 50/53791

[51] Int. Cl.² ............................................... F01N 1/00
[52] U.S. Cl. ...................................... 181/229; 181/255
[58] Field of Search ............... 181/204, 211, 226, 229, 181/259, 262, 263, 265, 266, 282, 255; 123/26; 138/40, 89.1, 89.3, 89.4

[56] References Cited

U.S. PATENT DOCUMENTS

| 2,323,955 | 7/1943 | Wilson | 181/229 |
| 3,557,902 | 1/1971 | Brown et al. | 181/229 |
| 3,712,416 | 1/1973 | Swanson et al. | 181/229 |
| 3,810,526 | 5/1974 | Kawasaki | 181/229 |
| 3,835,956 | 9/1974 | Kishira | 181/229 |

FOREIGN PATENT DOCUMENTS 208,658   4/1960   Austria ..................................... 181/229

Primary Examiner—L. T. Hix
Assistant Examiner—Benjamin R. Fuller
Attorney, Agent, or Firm—Toren, McGeady and Stanger

[57] ABSTRACT

A suction air muffler having a muffler case connected to the air cleaner, wherein a suction pipe connected at one end to the air inlet port formed in the muffler case extends through the muffler case. Air drawn by suction into the suction pipe passes through the muffler case before being delivered to the air cleaner, so that the noise produced by the air drawn by suction into the suction pipe of a motorcycle can be minimized.

4 Claims, 2 Drawing Figures

SUCTION AIR MUFFLER FOR A MOTORCYCLE

This is a continuation of application Ser. No. 672,331 filed Mar. 31, 1976, now abandoned.

BACKGROUND OF THE INVENTION

This invention relates to a suction air muffler for a motorcycle.

Heretofore, it has been customary to provide a muffler to a motorcycle for the purpose of reducing noise produced during operation of the motorcycle. The muffler hitherto provided to the motorcycle has been intended to silence noise produced by exhausts emitted from the engine through the exhaust pipe, and no means has ever been provided to silence noise produced by air drawn into the inlet pipe of the motorcycle. The air drawn by suction into the inlet pipe produces noise of a considerably high loudness level and cannot, therefore, be neglected from the point of view of avoiding the problem of environmental disruption by noise.

In motorcycles of the prior art, an air cleaner comprising a box and an air cleaner element housed in the box is connected to the inlet port of the engine. This places limitations on the space required for mounting a muffler mechanism for silencing noise produced by air drawn into the engine.

SUMMARY OF THE INVENTION

An object of this invention is to provide a suction air muffler for a motorcycle effective to prevent production of noise which would otherwise be produced by air drawn by suction into the inlet pipe of the motorcycle.

Another object of the invention is to provide a suction air muffler, simple in construction and low in cost, which can achieve excellent results in minimizing noise produced by air drawn into the inlet pipe without causing a reduction in the power developed by the engine of motorcycle wherein there are limitations placed on the space for providing a muffler to the air cleaner in view of structural relationship of the air cleaner with other parts.

According to the invention, the aforementioned objects are accomplished by providing a suction air muffler for a motorcycle wherein a muffler case is connected to the air cleaner and a suction pipe is inserted in the muffler case, so that air is drawn into the muffler case through the suction pipe, thereby minimizing production of noise produced by the air drawn into the inlet pipe.

DESCRIPTION OF THE PREFERRED EMBODIMENTS

Figure 1:
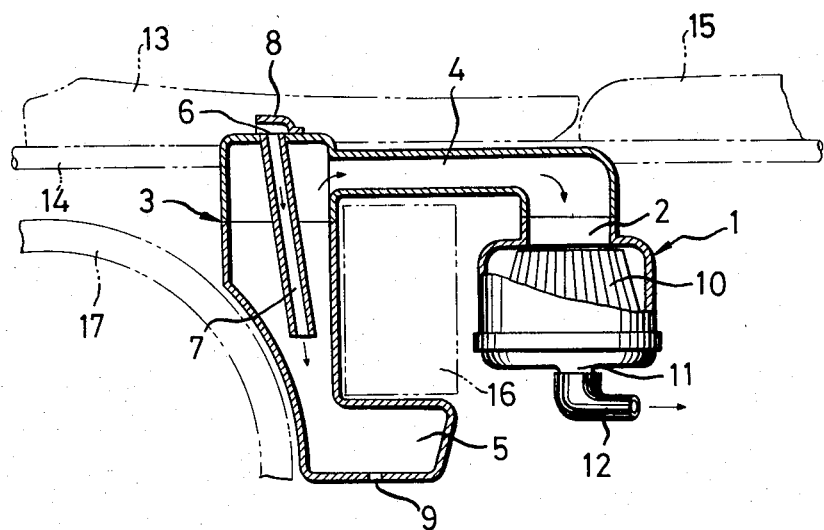
FIG. 1 is a sectional side view of the suction air muffler comprising one embodiment of the invention.

FIG. 1 shows one embodiment of the invention wherein a muffler case 3 made of polyethylene of high density is connected to an inlet port 2 of an air cleaner 1 and comprises a cylindrical air passage 4 and an air reservoir 5. The muffler case 3 is formed with an air inlet port 6 to which a suction pipe 7 is connected at one end thereof so that the suction pipe 7 is inserted in the muffler case 3. A suction cap 8 which opens transversely at one side is provided at the outside of the air inlet port 6 to prevent exposure of the air inlet port 6.

The air reservoir 5 is formed at its bottom with a drain port 9.

The air cleaner 1 houses therein an air cleaner element 10 and is formed with an air outlet port 11 connected to a carburetor (not shown) through a rubber boot 12.

The air cleaner 1 and muffler case 3 are disposed under a seat 13 shown in dash-and-dot lines. The numeral 14 designates a frame, the numeral 15 a tank, the numeral 16 a battery, and the numeral 17 a rear wheel mud guard.

In the suction air muffler of the aforesaid construction, air introduced through the air intake port 6 passes through the air suction pipe 7 into the air reservoir 5, from which the air is supplied through the cylindrical air passageway 4 into the air cleaner 1.

Figure 2:
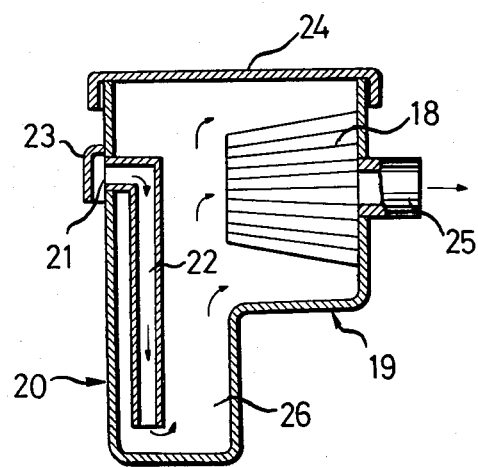
FIG. 2 is a sectional side view of the suction air muffler comprising another embodiment of the invention.

FIG. 2 shows another embodiment of the invention wherein a muffler case 20 made of polyethylene of high density is connected to an air cleaner 19 housing a cleaner element 18 therein. The muffler case 20 is formed with an air intake port 21 to which a suction pipe 22 is connected at one end thereof, and the suction pipe 22 is inserted in the muffler case 20. A suction cap 23 which opens transversely at one side is provided at the outside of the air intake port 21. The air cleaner 19 and muffler case 20 are covered at their top with a cover 24, while the air cleaner 19 is connected through an air outlet port 25 to a carburetor (not shown). The numeral 26 designates an air reservoir.

The noise silencing effect achieved by the suction air muffler according to the invention will now be described. Generally, a negative or sub-atmospheric pressure is intermittently produced in the suction air system during the suction stroke of an engine and causes pulsating of air pressure to occur. The pulsating of air pressure causes production of a suction air pulsating sound of low frequency. If the area of the suction air port is reduced, dissipation of energy of the suction air pulsating sound can be reduced. However, this has an adverse effect on the performance of the engine and results in an excessive reduction in the power developed by the engine because of inability to supply air in sufficient volume to the engine.

In the suction air muffler according to the invention, the suction pipe 7 (22) is connected to the air intake port formed in the muffler case 3 (20) which includes a cavity of a certain volume and which is disposed rearwardly of the air cleaner element housing. The suction air muffler according to the invention is constructed as aforesaid, so that the suction air pulsating sound can be reduced by virtue of the provision of the air reservoir 5 (26) and can be further reduced, if a suitable length is selected for the suction pipe 7 (22). The provision of the suction air muffler according to the invention to a motorcycle does not cause any adverse effect on the performance of the engine thereof, because it is possible to positively supply to the engine a sufficiently large volume of air to abruptly accelerate the engine by virtue of the provision of the air reservoir 5 (26) in the muffler case 3 (20).

The suction air muffler according to the invention can achieve excellent results in silencing noise by virtue of the feature that air is introduced through the air intake port and the suction pipe into the muffler case which has a cavity of a certain volume. The invention enables the suction air pulsating sound, which is produced in the engine through the carburetor, to be reduced greatly without causing an appreciable reduction in the performance of the engine.

The suction air muffler according to the invention can be produced readily at low cost by using polyethylene of high density or other material. The muffler is simple in construction and has no outwardly projecting part. The muffler according to the invention offers the advantages of being able to make good use of the space around the cleaner, being able to prevent damage, and not spoiling the beauty of the motorcycle. Moreover, since the muffler has the effect of preventing introduction of foreign matter into the engine, the muffler according to the invention is capable of achieving excellent results as a suction air muffler for a motorcycle.

I claim:

1. In a motorcycle including an internal combustion engine and having a forward direction of travel, the improvement of an air intake muffler assembly for the carburetor of said motorcycle internal combustion engine, said air intake muffler assembly comprising means including an air cleaner defining an inlet to said carburetor extending along an air path having a given air direction, a muffler casing defining a muffler chamber surrounding said carburetor air inlet through which all air entering said inlet passes, means defining the air intake port to said casing, said air intake port being arranged to open in a direction other than said forward direction of travel of said motorcycle, said air intake port thereby opening to always receive air therethrough during travel of said motorcycle from a direction other than the forward direction of travel of said motorcycle, pipe means extending from said casing intake port into said muffler chamber, said pipe means being arranged so that substantially all air entering said chamber is supplied through said pipe means, said pipe means defining a path along which air travels therethrough, said muffler assembly being constructed so that all air entering said carburetor air inlet passes along an air path which includes said air intake port of said casing, said pipe means and said muffler chamber, said assembly further including means for maintaining said air path between said air intake port and said carburetor air inlet with a directional component extending transversally to said given direction of said air inlet to said carburetor thereby to maintain a non-linear air path between said casing intake port and said carburetor air inlet to muffle noise created by said incoming air.

2. An assembly according to claim 1 wherein said means for maintaining said transverse directional component in said air path comprise said pipe means, said pipe means being configured to extend in a direction transverse to said given direction of said carburetor air inlet path.

3. An assembly according to claim 1 wherein said means for maintaining said air path with said transversally extending component includes means defining said muffler chamber with a portion thereof through which incoming air must pass, said portion extending in a direction transversally to said given direction of said carburetor air inlet path.

4. An assembly according to claim 1 further including a cap provided to partially extend over said air intake port and to open transversally to one side thereof, said cap operating to shield said intake port from entry therein of foreign matter.

* * * * *